Figure 1:
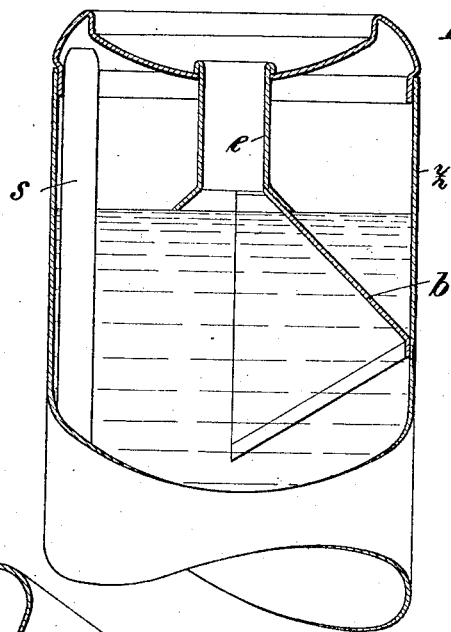

Sept. 30, 1924.                    G. SCHWORETZKY                    1,509,983

CONTAINER FOR LIQUIDS

Filed April 18, 1922

Inventor:
Gustav Schworetzky
By Kingdon
atty.

Patented Sept. 30, 1924.

1,509,983

UNITED STATES PATENT OFFICE.

GUSTAV SCHWORETZKY, OF ESSLINGEN-ON-THE-NECKAR, GERMANY.

CONTAINER FOR LIQUIDS.

Application filed April 18, 1922. Serial No. 555,202.

*To all whom it may concern:*

Be it known that I, GUSTAV SCHWORETZKY, residing at Esslingen-on-the-Neckar, Wurttemberg, Germany, have invented certain new and useful Improvements in Containers for Liquids, of which the following is a specification.

This invention relates to vessels to contain liquids and more particularly to such vessels which are provided with a central charging opening fitted with a tubular extension towards the interior. Inwardly extending inlets are necessary, for instance, in pressure cylinders. Such cylinders must never be filled with liquid right up to the top, as otherwise they would burst when the liquid extends under the influence of heat. The tubular extension of the inlet into the interior of the vessel renders the filling of the container right up to the top impossible inasmuch as it prevents a certain quantity of air from escaping through the outlet, when the vessel is filled with a liquid. The drawback of such vessels is that hitherto it was impossible to drain them entirely.

The object of the present invention is to so construct such vessels that they may be entirely emptied of the liquid when being cleaned.

This object is attained by providing inside the vessel a trough, gutter or scoop constructed of sheet metal, which leads from the wall of the vessel to the tubular outlet.

An embodiment of my invention is illustrated in the accompanying drawing by way of example.

Figure 2:
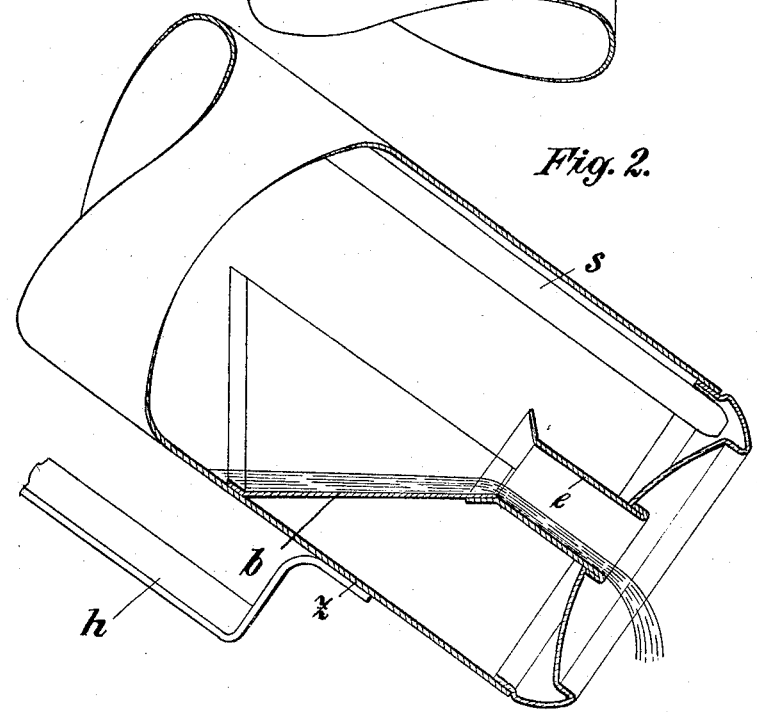

In the drawing is:

Fig. 1 a longitudinal section through the upper part of the improved vessel in the upright position and Fig. 2 the same in the inverted inclined position for draining.

Similar parts are indicated by the same letters of reference in both figures of the drawing.

On referring to the drawings it will be seen that the vessel or container $z$ is furnished in its interior with a trough or scoop $b$ made of sheet metal which extends in an oblique or inclined position from the wall of the vessel to the tubular inlet $e$. The trough or scoop is fixed at both its ends in any suitable manner. When draining the vessel the same is inverted and emptied of the larger portion of its contents. The vessel is then again brought into the upright position and turned until the trough or scoop takes up the position shown in Fig. 2, when the vessel is again inverted. It is obvious that the contents of the vessel may then entirely be discharged. In the construction shown by way of example and which represents the container of a portable fire extinguisher the scoop is situated diametrically opposite the valve-controlled outlet of the discharge pipe $s$, so that the vessel can easily be turned into the correct position to effect the complete discharge of its contents, the situation of the interiorly arranged trough $b$ being indicated by the position of the handle $h$ arranged on the outside of said vessel but side by side with said trough. Other indication for the correct position of the vessel for complete discharge may, of course, be provided at the outside of the vessel.

It will be readily understood that I do not limit myself to the details of the construction illustrated or to the type of vessel shown, as these may naturally vary within wide limits.

What I claim as my invention and desire to secure by Letters Patent is:

1. In a container for liquids, the combination of an outer shell, a top and a bottom plate in said shell, a central charge opening in said top plate, a tube fitting into said charge opening and extending into the interior of the container, and a trough extending obliquely from said shell to the free end of said tube.

2. In a container for liquids, the combination of an outer shell, top and bottom plates in said shell, a central opening fitted with a tubular extension towards the interior in said top plate, a trough extending obliquely from said shell to said tubular extension and means upon the outside of the container to indicate the position of said trough.

In testimony whereof I affix my signature.

GUSTAV SCHWORETZKY. [L. S.]

Witnesses:

BERT A. BRAUN, [L. S.]
VIKTOR BENDY. [L. S]